(12) United States Patent
Srivastava

(10) Patent No.: US 8,725,811 B2
(45) Date of Patent: May 13, 2014

(54) MESSAGE ORGANIZATION AND SPAM FILTERING BASED ON USER INTERACTION

(75) Inventor: Kumar S Srivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1410 days.

(21) Appl. No.: 11/275,412

(22) Filed: Dec. 29, 2005

(65) Prior Publication Data

US 2007/0156886 A1    Jul. 5, 2007

(51) Int. Cl.
*G06F 15/16* (2006.01)
*H04L 12/58* (2006.01)

(52) U.S. Cl.
CPC ............... *H04L 51/12* (2013.01); *H04L 51/08* (2013.01)
USPC ......................................... 709/206; 709/207

(58) Field of Classification Search
USPC .................................................. 709/206, 207
See application file for complete search history.

(56) References Cited

U.S. PATENT DOCUMENTS

| | | | | |
|---|---|---|---|---|
| 7,007,067 B1 * | 2/2006 | Azvine et al. | ................ | 709/202 |
| 7,873,996 B1 * | 1/2011 | Emigh et al. | .................... | 726/22 |
| 2003/0018706 A1 * | 1/2003 | Bates et al. | .................... | 709/203 |
| 2003/0187937 A1 * | 10/2003 | Yao et al. | ...................... | 709/206 |
| 2004/0019648 A1 * | 1/2004 | Huynh et al. | .................. | 709/206 |
| 2004/0177120 A1 * | 9/2004 | Kirsch | .......................... | 709/206 |
| 2005/0015432 A1 * | 1/2005 | Cohen | .......................... | 709/201 |
| 2005/0091320 A1 * | 4/2005 | Kirsch et al. | .................. | 709/206 |
| 2005/0198159 A1 * | 9/2005 | Kirsch | .......................... | 709/206 |
| 2006/0010217 A1 * | 1/2006 | Sood | ............................. | 709/206 |
| 2006/0031306 A1 * | 2/2006 | Haverkos | ...................... | 709/206 |
| 2006/0242244 A1 * | 10/2006 | Logue et al. | .................. | 709/206 |

OTHER PUBLICATIONS

USC Marshall School of BuUSC Marshall School of Business ("What's new in Outlook 2003", Sep. 28, 2004, p. 1-24, retrieved from http://www.marshall.usc.edu/assets/003/5311.pdf on Nov. 12, 2008).*

* cited by examiner

*Primary Examiner* — Kenny Lin
(74) *Attorney, Agent, or Firm* — Sung Kim; Andrew Sanders; Micky Minhas

(57) ABSTRACT

Embodiments of message organization and spam filtering based on user interaction are presented herein. In an implementation, user interaction with a plurality of messages in a user interface is monitored, which includes analyzing an amount of time spent by a user in interacting with each message. Subsequent messages may then be filtered based on the monitored user interaction. In another implementation, messages are processed that are received via a network using a spam filter that was generated based on monitored interaction of a user with previous messages. The processing results in a value describing a relative likelihood of importance of each of the processed message to the user. The processed messages are then arranged for display in an order, one to another, in a user interface based on respective values.

20 Claims, 5 Drawing Sheets

MESSAGE ORGANIZATION AND SPAM FILTERING BASED ON USER INTERACTION

BACKGROUND

Users are continually exposed with an ever increasing variety of techniques and devices that provide message communication. For example, users may use client devices (e.g., desktop computers, wireless phones, and so on) to communicate through the use of email, i.e., electronic mail. Email employs standards and conventions for addressing and routing such that the email may be delivered across a network, such as the Internet, utilizing a plurality of devices. Thus, email may be transferred within a company over an intranet, across the world using the Internet, and so on.

Unfortunately, as the prevalence of these techniques for sending messages has continued to expand, the amount of "spam" encountered by the user has also continued to increase. Spam is typically thought of as an email that is sent to a large number of recipients, such as to promote a product or service. Because sending an email generally costs the sender little or nothing to send, "spammers" have developed which send the equivalent of junk mail to as many users as can be located. Even though a minute fraction of the recipients may actually desire the described product or service, this minute fraction may be enough to offset the minimal costs in sending the spam.

To counteract spam, techniques were developed to filter spam from "legitimate" email through the use of "spam filters". These traditional techniques typically used a generalized spam filter which detected spam by analyzing signatures of the message being communicated. However, a definition of "spam" may vary greatly between users, e.g., an email that is of interest to a first user may be considered spam by a second user. Therefore, the generalized spam filters may provide false positives and therefore filter out email that is of interest to the user, which may be frustrating and diminish the user's experience with the email.

SUMMARY

Message organization and spam filtering techniques based on user interaction are described. In an implementation, user interaction with a plurality of messages in a user interface is monitored, such as by execution of a module. A variety of types of user interaction may be monitored, which includes analyzing an amount of time spent by a user in interacting with each message. Subsequent messages may then be filtered based on the monitored user interaction.

In another implementation, messages are processed that are received via a network using a spam filter that was generated based on monitored interaction of a user with previous messages. The processing results in a value describing a relative likelihood of importance of each of the processed message to the user. The processed messages are then arranged for display in an order, one to another, in a user interface based on respective values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
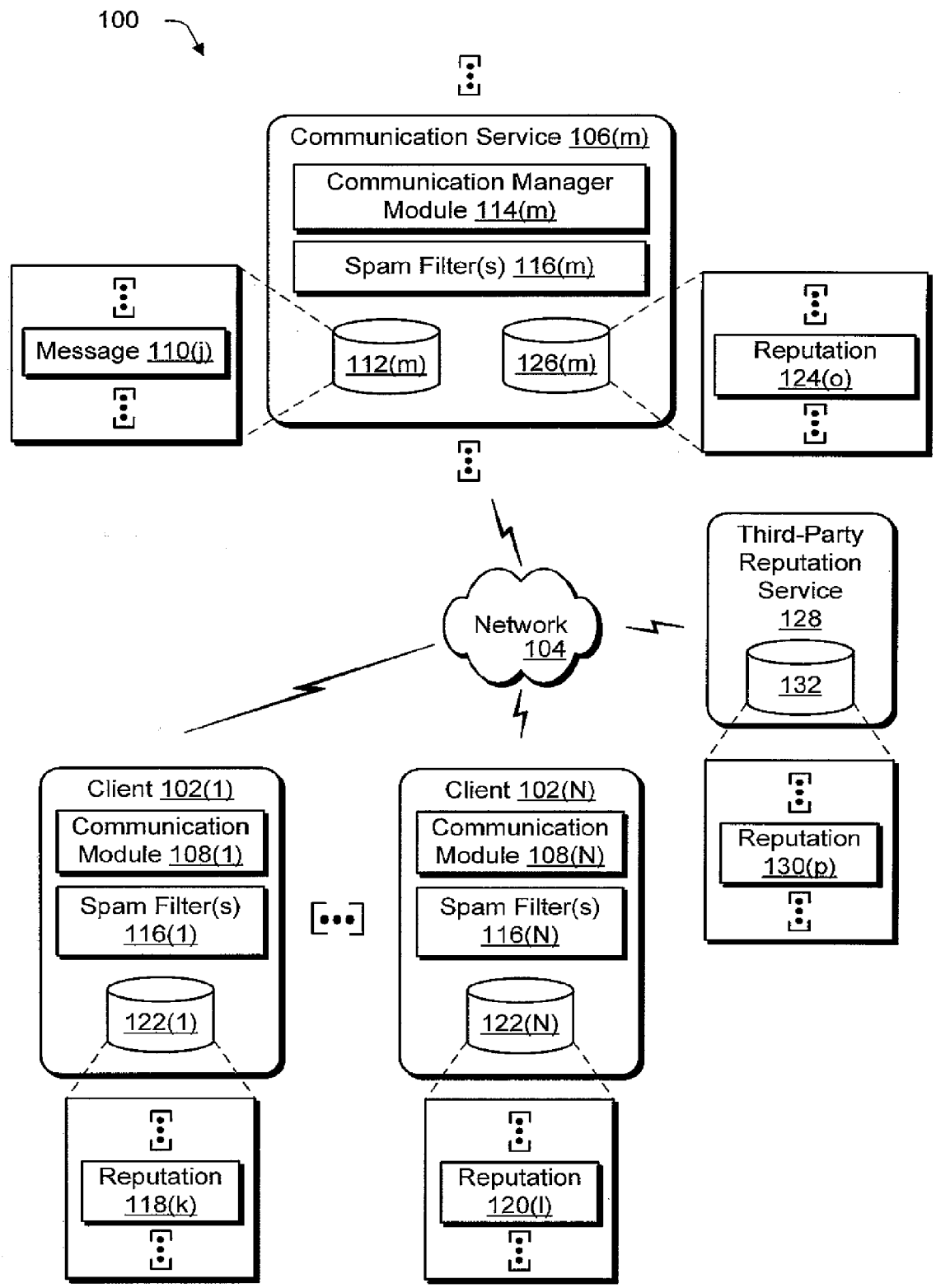
FIG. 1 is an illustration of an environment operable for communication of messages, such as emails, instant messages, and so on, across a network and is also operable to employ user interactive strategies.

As the prevalence of techniques for sending messages has continued to expand, the amount of "spam" encountered by the user has also continued to increase. Traditional techniques used to filter spam (e.g., spam filters) analyzed signatures of spam that was identified by one or more other users. However, one user's definition of spam may differ from another user's definition. For instance, an email advertising cheap airfares may be considered spam by a user that prefers a particular airline but another user that is scheduling a trip may find that email useful and thus is not spam to that other user.

Techniques are described, in which, a personalized spam filter may be generated to filter spam based on that user's interaction with previous messages. For example, a module may be executed that monitors a user's interaction with each email received by the user, such as an amount of time that is spent by the user when interacting with the message. Information describing this interaction may then be stored according to a sender of the message to develop a reputation for each sender. These reputations may then be used to filter subsequent messages.

For instance, a user may spend a relatively small amount of time (e.g., 3-4 seconds) when interacting with messages from a cheap airfare site but a relatively longer amount of time (e.g., greater than 10 seconds) when interacting with messages from an auto manufacturer. The relatively small amount of time spent with messages from the cheap airfare site may indicate that the user is not interested in those messages (e.g., the user is merely deleting the messages), and therefore the messages and the cheap airfare site itself are of little interest to the user. The relatively large amount of time spent with messages from the auto manufacturer, however, may indicate that the user is interested in those messages and therefore those messages are of relatively greater importance to the user. Accordingly, messages from the cheap airfare site may be considered spam while messages from the auto manufacturer may be considered "legitimate", i.e., of interest to the user. Although an amount of time has been described, a variety of interactions may be monitored to determine relative importance of messages, further discussion of which may be found in relation to FIGS. 3-4.

The determined "importance" of the messages to the user may also be utilized for a variety of other purposes besides filtering spam. For example, each message processed by a spam filter may be assigned a value which indicates a relative likelihood that the message will be considered spam by the user. Consequently, this value may also indicate a relative amount of importance to the user for the particular email. These values may then be used to organize messages in a user interface, such as in an order of importance, such that the user may efficiently navigate to desired emails. Further discussion of message organization based on relative importance may be found in relation to FIG. 5.

In the following description, an exemplary environment is first described which is operable to employ the proof techniques. Exemplary procedures are then described which may operate in the exemplary environment, as well as in other environments.

Exemplary Environment

FIG. 1 is an illustration of an environment 100 operable for communication of messages across a network and to employ. The environment 100 is illustrated as including a plurality of clients 102(1), . . . , 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user, software and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(N) may be communicatively coupled via a peer-to-peer network to communicate, one to another. Each of the clients 102(1), 102(N) may also be communicatively coupled to one or more of a plurality of communication services 106(m) (where "m" can be any integer form one to "M") over the Internet.

Each of the plurality of clients 102(1), . . . , 102(N) is illustrated as including a respective one of a plurality of communication modules 108(1), . . . , 108(N). In the illustrated implementation, each of the plurality of communication modules 108(1)-108(N) is executable on a respective one of the plurality of clients 102(1)-102(N) to send and receive messages. For example, one or more of the communication modules 108(1)-108(N) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 108(1)-108(N) may be configured to send and receive instant messages. Instant messaging provides a mechanism such that each of the clients 102(1)-102(N), when participating in an instant messaging session, may send text messages to each other. The instant messages are typically communicated in real time, although delayed delivery may also be utilized, such as by logging the text messages when one of the clients 102(1)-102(N) is unavailable, e.g., offline. Thus, instant messaging may be thought of as a combination of email and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In an implementation, the communication modules 108(1)-108(N) communicate with each other through use of the communication service 106(m). For example, client 102(1) may form a message using communication module 108(1) and send that message over the network 104 to the communication service 106(m) which is stored as one of a plurality of messages 110(j), where "j" can be any integer from one to "J", in storage 112(m) through execution of a communication manager module 114(m). Client 102(N) may then "log on" to the communication service (e.g., by providing a name and password) and retrieve corresponding messages from storage 112(m) through execution of the communication module 108(N). A variety of other examples are also contemplated.

In another example, client 102(1) may cause the communication module 108(1) to form an instant message for communication to client 102(N). The communication module 108(1) is executed to communicate the instant message to the communication service 106(m), which then executes the communication manager module 114(m) to route the instant message to the client 102(N) over the network 104. The client 102(N) receives the instant message and executes the respective communication module 108(N) to display the instant message to a respective user. In another instance, when the clients 102(1), 102(N) are communicatively coupled directly, one to another (e.g., via a peer-to-peer network), the instant messages are communicated without utilizing the communication service 106(m). Although messages configured as emails and instant messages have been described, a variety of textual and non-textual messages (e.g., graphical messages, audio messages, and so on) may be communicated via the environment 100 without departing from the sprit and scope thereof.

As previously described, the efficiently of the environment 100 has also resulted in communication of unwanted commercial messages, commonly referred to as "spam". Spam is typically provided via email that is sent to a large number of recipients, such as to promote a product or service. Thus, spam may be thought of as an electronic form of "junk" mail. Because a vast number of emails may be communicated through the environment 100 for little or no cost to the sender, a vast number of spammers are responsible for communicating a vast number of unwanted and irrelevant messages. Thus, each of the plurality of clients 102(1)-102(N) may receive a large number of these irrelevant messages, thereby hindering the client's interaction with actual messages of interest, i.e., messages that are "important" to the respective clients 102(1)-102(N).

A technique which may be utilized to hinder the communication of unwanted messages is through the use of spam filters 116(1)-116(N). Spam filters 116(1)-116(N) are representative of software which may be utilized to filter "spam" messages from "legitimate" messages. For example, the spam filters 116(1)-116(N) executed on the respective clients 102(1)-102(N) may examine messages received via the network 104 to determine whether to permit the messages to be output by the respective clients 102(1)-102(N), such as displayed in the client's inbox. The communication service 106(m) may also employ similar functionality and therefore is also illustrated as including a respective spam filter 116(m).

The spam filters 116(1)-116(N), 116(m) may be configured in a variety of ways to provide spam filtering. For example, the spam filters 116(1)-116(N) may be preconfigured and provided to each of the clients 102(1)-102(N) over the network 104 to filter spam that has been identified by the communication service 106(m). For instance, the communication service 106(m) may identify a particular sender of messages as a "spammer" and therefore provide this identification to filter messages from the particular sender. Therefore, messages received from the identified "spammer" may be treated accordingly, such as routed to a dedicated spam folder, deleted, and so on.

In another example, one or more of the spam filters 116(1)-116(N) may be "personalized" for use by the respective clients 102(1)-102(N). The respective communication modules 108(1)-108(N), for instance, may monitor interaction by the respective clients 102(1)-102(N) with messages received via the network 104. A variety of interactions may be monitored, such as an amount of time spent interacting with the messages, "movement" of the messages (e.g., to a particular folder), and so on, further discussion of which may be found in relation to FIG. 2.

The interaction may then be used to form a reputation for each sender of the messages, which are illustrated as reputations 118(k), 120(l) (where "k" and "l" can be any integer from one to "K" and "L", respectively) that are stored in respective storage 122(1), 122(N). The reputations 118(k), 120(l) are then used to filter subsequent messages received at the clients 102(1)-102(N). For instance, spam filters may be generated from the reputations to leverage the monitored interaction and therefore determine a likelihood of whether the message processed by the generated spam filters is "spam" or "legitimate".

Additionally, the reputations 118(k), 120(l) may be published such that the client's 102(1)-102(N) experience with messages may be leveraged by other clients and/or services. For example, client 102(1) may communicate the reputations 118(k) over the network 104 for storage by the communication service 106(m) as reputations 124(o) (where "o" can be any integer from one to "O") in storage 126(m). The communication service 106(m) may then leverage the reputations 124(o), such as to filter messages 110(j) before communication over the network 104 to the clients 102(1)-102(N) to prevent communication of unwanted messages, to "mark" messages that have a likelihood of being sent by a spammer, and so on.

Likewise, the reputations 118(k), 120(l) may be communicated over the network 104 to a third-party reputation service 128 for storage as reputations 130(p) (where "p" can be any integer from one to "P") in storage 132. The reputations 130(p) may thus be aggregated by the third-party reputation service 128 for a variety of purposes, such as to communicate reputations between the clients 102(1)-102(N), to pre-configure spam filters for use by the clients 102(1)-102(N) and/or the communication service 106(m), and so on. Further discussion of monitored user interaction and reputations may be found in relation to FIGS. 3-4.

The spam filters 116(1)-116(N), through processing of the messages, may arrive at a value that indicates a relative likelihood that the processed message is spam or legitimate. Additionally, when the spam filter is "personalized" for a particular client (e.g., by leveraging information obtained by monitoring user interaction with messages) the value may also indicate the relative importance of the message to the monitored client. For example, when the spam filter 116(1) incorporates reputation 118(k) information from client 102(1), the value may indicate whether message is likely to be important to the client 102(1) or whether the message is likely spam, and thus is not likely to be important to the client 102(1). This determined importance may be used in a variety of ways, such as to filter messages and also organize the messages for output in an order of likely importance to the client 102(1), further discussion of which may be found in relation to FIG. 5.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the user interaction strategies described below are platform-independent, meaning that the strategies may be implemented on a variety of commercial computing platforms having a variety of processors.

Figure 2:
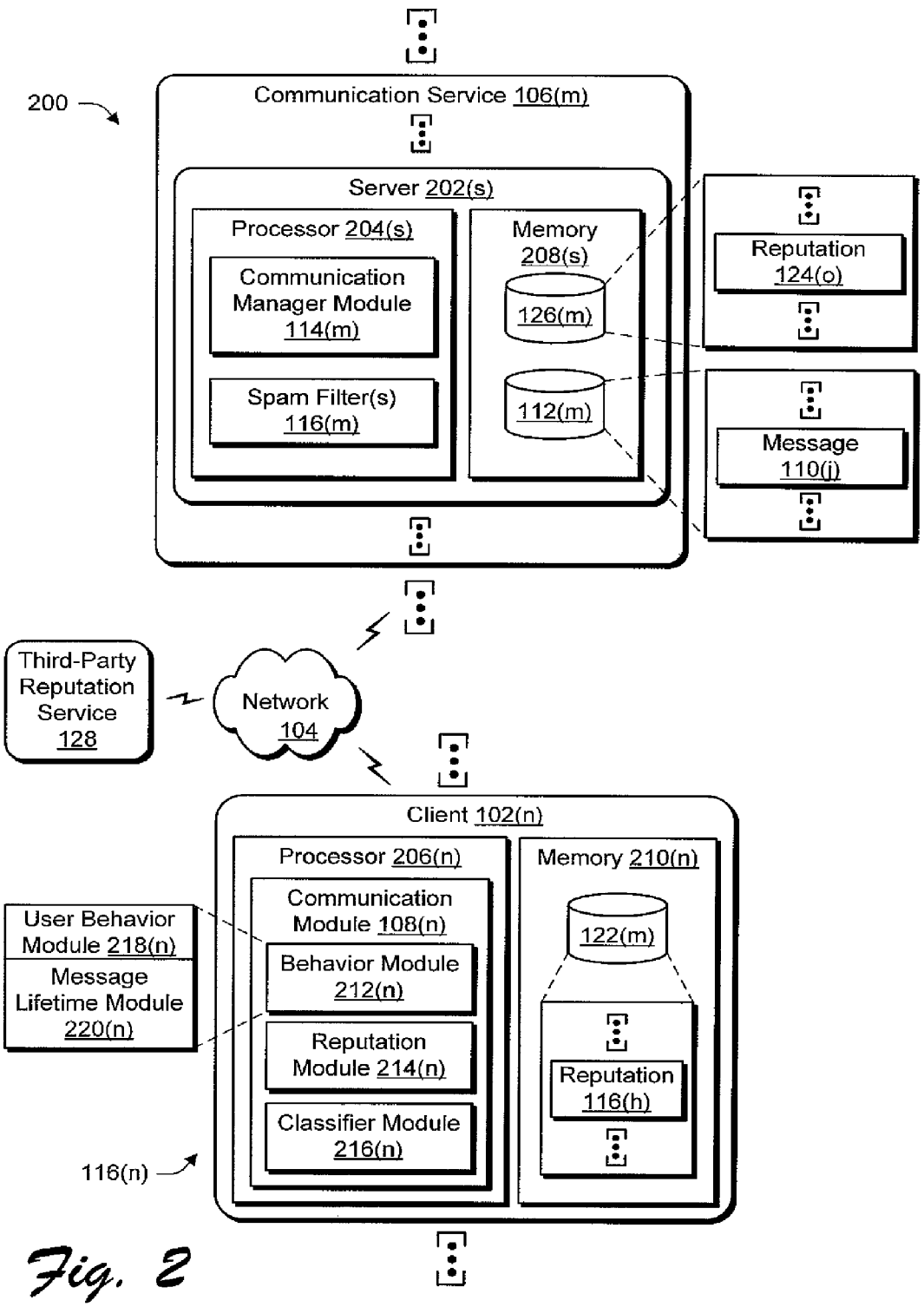
FIG. 2 is an illustration of a system in an exemplary implementation showing a plurality of clients and a communication service of FIG. 1 in greater detail.

FIG. 2 is an illustration of a system 200 in an exemplary implementation showing the plurality of clients 102(n) and the communication service 106(m) of FIG. 1 in greater detail. Client 102(n) is representative of any of the plurality of clients 102(1)-102(N) of FIG. 1, and therefore reference will be made to client 102(n) in both singular and plural form. The communication service 102(m) is illustrated as being implemented by a plurality of servers 202(s), where "s" can be any integer from one to "S", and the client 102(n) is illustrated as a client device. Further, the servers 202(s) and the client 102(n) are illustrated as including respective processors 204(s), 206(n) and respective memory 208(s), 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(s), 210(n) is shown for the respective server 202(s) and client 102(n), memory 208(s), 210(n) may be representative of a wide variety of types and combinations of memory may be employed, such as random access memory (RAM), hard disk memory, removable medium memory, and other computer-readable media.

The clients 102(n) are illustrated as executing the communication module 108(n) on the processor 206(n), which are also storable in memory 210(n). The spam filters 116(n) are illustrated as being stored in memory 210(n) and are executable on the processor 206(n). The communication module 108(n) is executable to utilize a user's behavior when interacting with messages to gather data to develop reputations 116(h) of senders of the messages. The client 102(n) may employ a variety of architectures to perform this monitoring and one or more subsequent actions, an example of which is described as follows.

The communication module 108(n), for instance, is illustrated as including a plurality of reputations 116(h) in storage 112(m). Additionally, the communication module 108(n) is also illustrated as implementing the spam filter 116(n) via a variety of sub-modules which include a behavior module 212(n), a reputation module 214(n) and a classifier module 216(n). As previously described, the reputations 116(h) may include an entry which includes an identifier for each sender of a message that was received by the client 102(n) and a value indicating the reputation of the identified sender. For instance, the value may be a score (e.g., a numerical indication) that indicates a relative likelihood that the identified sender is a spammer. The value may also indicate the relative "importance" of the identified sender to the client 102(n). This importance may be determined in a variety of ways.

The behavior module 212(n), for instance, is representative of functionality to analyze message behavior. For example, the behavior module 212(n) may include a user behavior module 218(n) that is executable to analyze the user's behavior with messages, such as how and which messages are moved around by the user (e.g., to different folders), how often incoming messages are routed automatically by user-defined rules, which emails are deleted by the user, and so on.

The behavior module 212(n) may also include a message lifetime module 220(n) which analyzes the lifetime of each message. For instance, the message lifetime module 214(n) may track how long a particular email has lived in an inbox as "read" or "unread", whether the email has been combined with another email, whether the email has been marked for follow-up, how long the status has remained the same for the email (e.g., read, unread, junk, for follow-up), and so on. Further, the message lifetime module 220(n) and/or the user behavior module 218(n) may monitor user interaction with contents of the message, such as whether the user copied text or pictures and placed them on a clipboard; whether the user used hyperlinks in the email to access content over the network 104; whether the user replied, forwarded or deleted the email; and so on. Thus, the behavior module 212(n) may monitor a wide variety of user interaction with messages, further discussion of which may be found in relation to FIGS. 3-4.

The reputation module 214(n) is representative of functionality that is executable to generate a reputation 116(h) based on behavior observed through execution of the behavior module 212(n). For example, the reputation module 214(n), when executed, may generate a reputation score for an identity (i.e., a sender) that has sent one or more messages to the client 102(n). The reputation score may be based on configurable rules that are stored on the client 102(n) which analyze data provided by the behavior module 212(n) to create a reputation score that is based on the user's interaction with messages from that sender. The reputation score may then be stored in storage 122(m) as reputation 116(h). A variety of other examples are also contemplated.

The classifier module 216(n) is representative of functionality that filters (e.g., classifies) messages using the reputations 116(h). The classifier module 216(n) is executable to examine messages when received over the network 104 and determine a sender of the message, i.e., an identity of the sender. The classifier module 216(n) may then query the storage 122(m) (which may be configured as a database) to locate a corresponding reputation of the sender from the plurality of reputations 116(h). The classifier module may then classify each message based on the reputation of the corresponding sender, such as by classify the message as "spam", "not spam", "questionable" (e.g., "potentially spam"), "not able to be classified", and so on. Actions may then be performed based on the classification, such as by routing to particular folders (e.g., spam, questionable and so on), deleting the message, route to inbox, and so on, further discussion of which may be found in the following procedures.

The architecture may also employ an external reputation service, such as the third-party reputation service 128 previously described. The service may be used to store, update and disseminate reputations of senders that have sent messages to clients that subscribe to the service. For example, the clients 102(1)-102(N) may subscribe to the third-part reputation service 128 and receive aggregated reputations of senders (e.g., in real time, batched, and so on) through an XML-based protocol. The clients 102(1)-102(N) may also agree to publish their generated reputations 116(h) to the third-party reputation service 128 for dissemination to other clients, the communication service 106(m), and so on. The third-party reputation service 128 may be implemented as a SOAP web service to provide functionality for the client 102(n) to request and/or upload reputations.

Exemplary Procedures

The following discussion describes user interaction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 3:
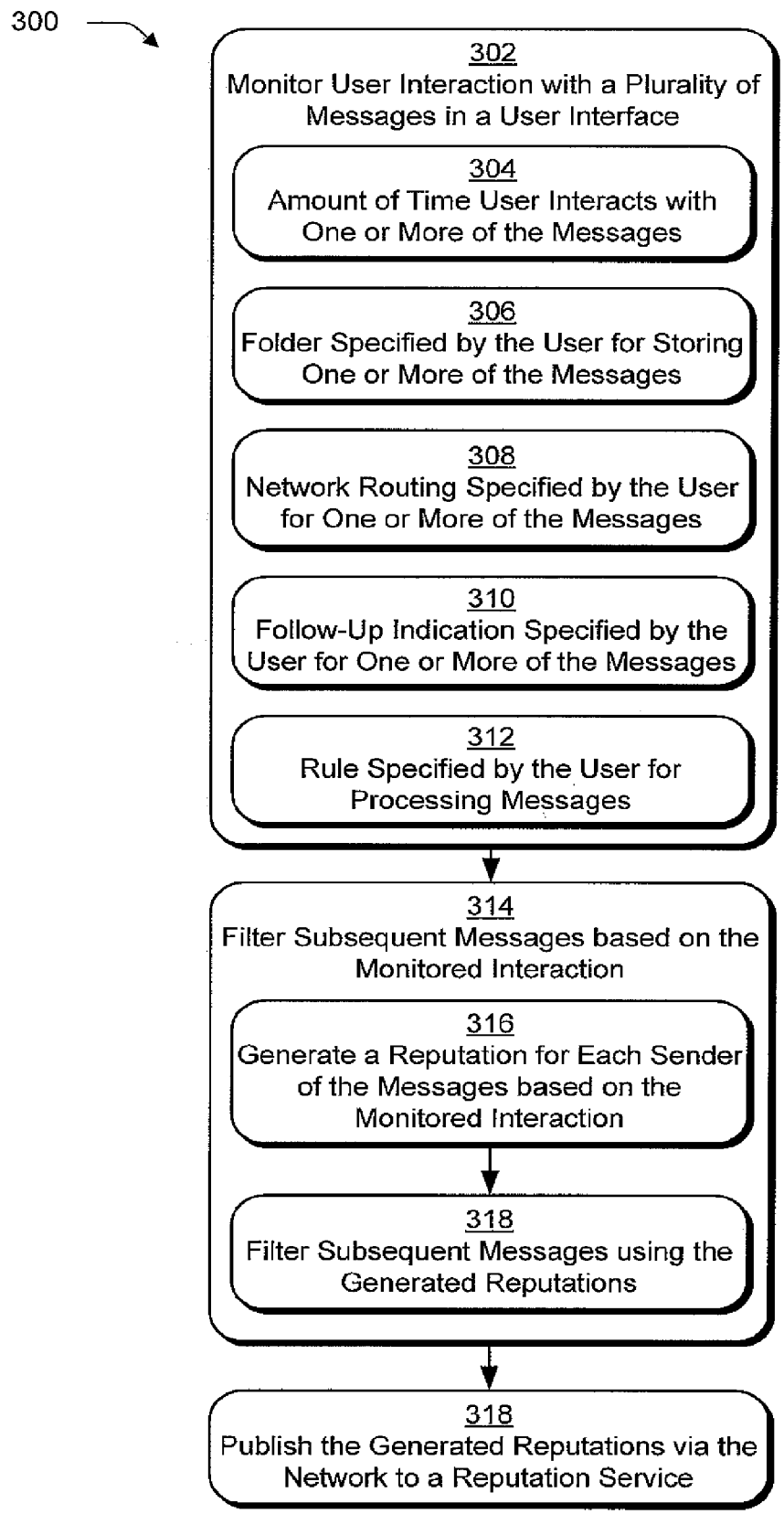
FIG. 3 is a flow chart depicting a procedure in an exemplary implementation in which user interaction with messages is monitored and used to filter subsequent messages.
Figure 4:
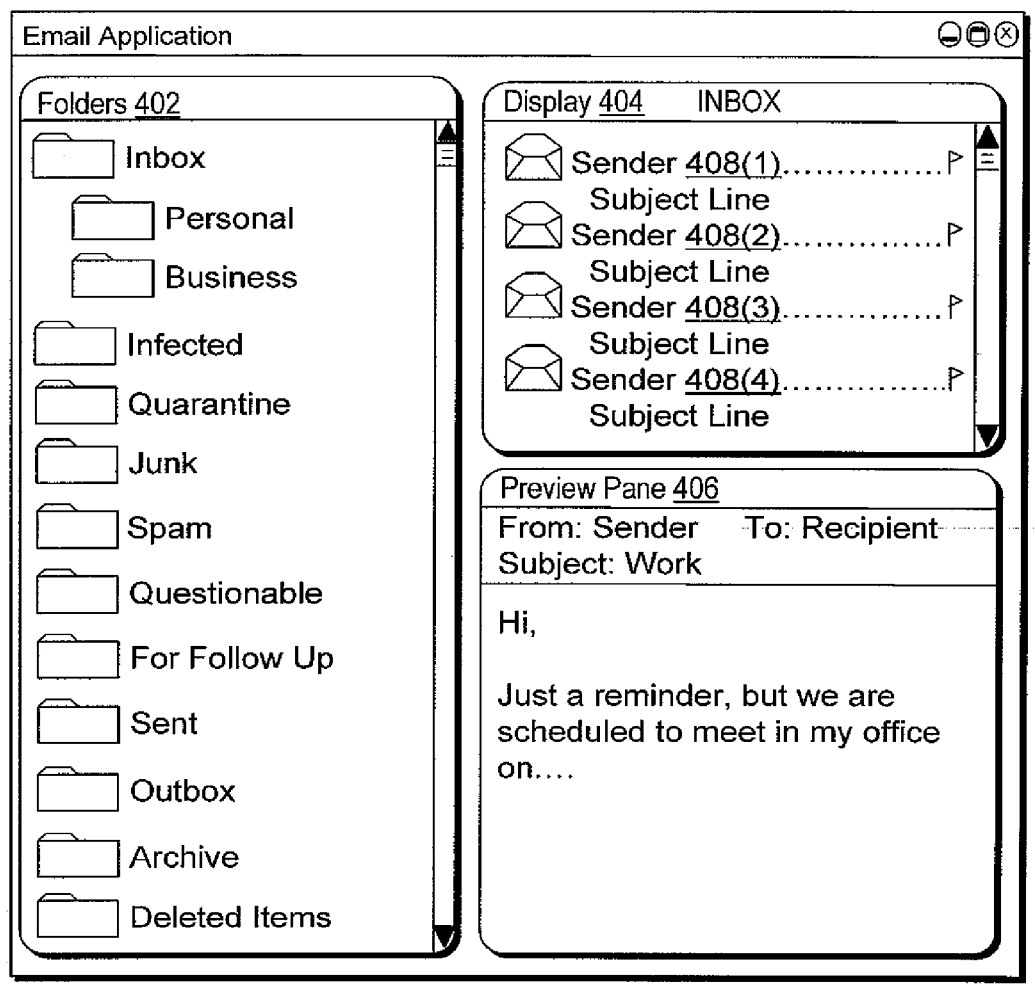
FIG. 4 is an illustration of an exemplary user interface, with which, user interaction may be monitored.

FIG. 3 depicts a procedure 300 in an exemplary implementation in which user interaction with messages is monitored and used to filter subsequent messages. In the following discussion, reference will also be made to the user interface 400 of FIG. 4.

User interaction with a plurality of messages in a user interface is monitored (block 302). The client 102(1), for example, may execute the communication module 108(1) to monitor interaction of the client 102(1) with messages received via the network 104. A variety of different interactions may be monitored, examples of which are described as follows.

The user, for instance, may interact with a user interface 400 that includes a folders 402 pane, a display 404 pane and a preview pane 408. The folders 402 pane includes a plurality of folders that may be used to organize messages, which are illustrated as an "inbox", "infected", "quarantine", "junk", "spam", "questionable", "for follow up", "sent", "outbox", "archive" and "deleted items". Further these folders may have sub-folders, such as the "personal" and "business" folders which are illustrated as sub-folders in the "inbox".

When a folder is selected, contents of that folder are displayed in the display 404 pane. For example, the display pane 404 is illustrated as displaying the contents of the inbox as a plurality of messages 408(1)-408(4). Each message has an indication of a sender that sent the respective message and a subject line. Likewise, when a message is selected in the display 404 pane, contents of the message are displayed in the preview pane 406. The user may interact with the messages in the user interface 400 in a variety of ways which may be monitored.

For example, an amount of time spent by the user when interacting with messages may be monitored (block 304), such as by monitoring an amount of time, after selection by the user, the message is displayed in the preview pane 406, an amount of time the message is selected, and so on.

In another example, a folder specified by the user for storing one or more of the messages is monitored (block 306). For instance, after reading the message, the user may leave the message in the inbox for a significant amount of time, thereby indicating that the message is not likely to be spam and does have a likelihood of being important to the user. Another message, however, after a brief period may be moved to the deleted items folders, and thus may indicate that the user considers the message spam and is not important to the user. Yet another message may be moved directly from the inbox (as displayed in the display 404 pane) to a spam folder. A variety of other instances are also contemplated.

In a further example, network routing specified by the user for one or more of the messages (block 308) may be monitored. For instance, if the user replies to a message and/or forwards a message, it is less likely that the message is considered spam by the user and is likely to be important to the user.

In yet another example, a follow-up indication specified by the user for one or more of the messages (block 310) may be monitored. For example, each of the messages displayed in the display pane are illustrated as having a corresponding flag. Each flag is selectable by the user (e.g., through use of a cursor control device) to "mark" the corresponding message for follow-up, which causes the marked message to also be accessible through the "for follow-up" folder in the folders 402 pane. As before, when the user marks the message for follow-up, it is likely that the message is important to the user and unlikely that the user considers the message spam.

In still yet another example, a rule specified by the user for processing messages (block 312) is monitored. A rule may include a criteria and an action to be performed on respective messages that have the criteria. The user, for instance, may specify that each message from a particular sender is to be moved directly to the spam folder, and thus, indicates that the user considers the particular sender to be a spammer. In another instance, the user may specify a rule such that each message that contains a particular word or words (e.g., "cheap tickets") is to be sent directly to the "deleted items" folder and thus is considered spam. The rules may also be used to indicate messages that are important to the user. For instance, a rule may be specified that each message that includes the text "project X" is to be sent directly to the business sub-folder of the inbox folder and thus is considered important to the user and is less likely to be considered spam. Likewise, a rule may be specified that each email received from "mom" or "Wife" is sent directly to the "personal" sub-folder. A variety of other instances are also contemplated.

Subsequent messages are then filtered based on the monitored interaction (block 314). For example, a reputation may be generated for each sender of the messages based on the monitored interaction (block 316). Subsequent messages may then be filtered using the generated reputations (block 318). The client 102(*n*), for instance, may receive a message from a particular sender. However, the particular sender may have a value for the reputation which indicates that messages from the particular sender are likely to be considered spam. This value may be based on the interaction that was monitored with previous messages from the sender, such as a brief amount of time spent interacting with the message, the interaction was limited to moving the messages to a deleted items folder, and so on. Thus, the client may leverage monitored interaction to arrive at a personal definition of spam for the user.

Although the above implementation was described in relation to email, these techniques may also be employed by other mediums of communication, such as internet protocol (IP) telephony (e.g., using data about the storage of voicemails), applying reputation information generated through user interaction to other mediums of communication (e.g., voice over IP), and so on. Additionally, reputation information may be aggregated from the interaction with several forms of communication and applied to several different mediums of communication through a centralized communication reputation system, e.g., the third-party reputation service of FIG. 1.

Figure 5:
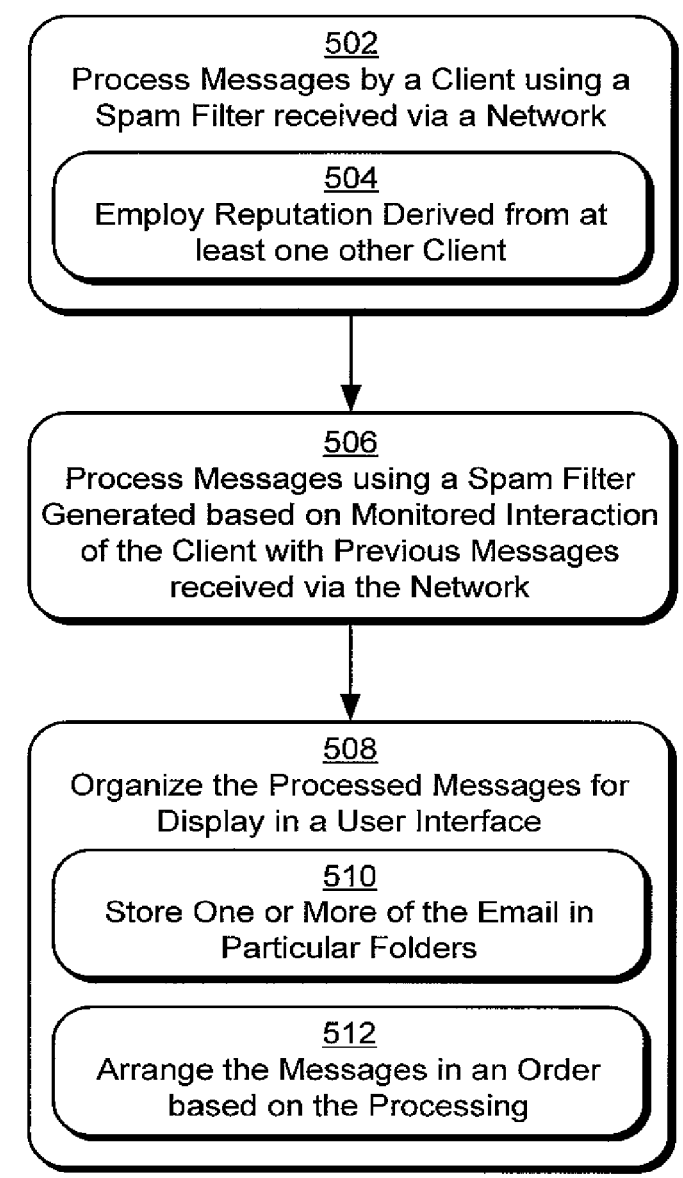
FIG. 5 is a flow chart depicting a procedure in an exemplary implementation in which messages are processed by a spam filter to determine relative importance of the messages to a user, which is then utilized to organize the messages for display in a user interface.

FIG. 5 depicts a procedure 500 in an exemplary implementation in which messages are processed by a spam filter to determine relative importance of the messages to a user, which is then utilized to organize the messages for display in a user interface. Messages are processed by a client using a spam filter received via a network (block 502). For example, client 102(1) may receive a pre-configured spam filter to initially filter messages received at the client 102(1). The spam filter may be generated in a variety of ways, such as to employ a reputation derived from at least one other client (block 504). Therefore, the client may leverage the other client's experience with messages to filter spam.

Additionally, the messages may be processed using a spam filter that was generated based on monitored interaction of the client with previous messages received via the network (block 506). For example, a spam filter generated based on the monitored interactions of block 302 of FIG. 3 may be used to process the message. As a result of the processing, a value (e.g., a numerical score) may be obtained which indicates a relative likelihood that the message is important to the client or whether that the message is likely to be considered spam to the client.

The processed messages may then be organized for display in a user interface (block 508). For example, messages may be placed in particular folders (block 510), such as in the user interface 400 of FIG. 4. Messages having values indicating a relatively high likelihood of being spam may be placed in the "spam" folder, for instance, whereas messages that have intermediate values indicating a likelihood generally between "important to the user" and "spam" may be placed in the "questionable" folder, and so on.

In another example, the messages may be arranged in an order based on the processing (block 512). For instance, each of the messages 408(1)-408(4) may be arranged in an order in the display 404 pane based on values which indicate relative importance of the messages to the user, e.g., by displaying messages that have values indicating importance before messages having a greater likelihood of being spam. In this way, the client may leverage the determined "importance" of the spam filter to arrange messages in the user interface. A variety of other instances are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
monitoring, by a client device, a plurality of different user interactions in a user interface with a plurality of messages, wherein the monitoring includes analyzing an amount of time spent by a user in interacting with at least one message of the plurality of messages using the plurality of different user interactions over a lifetime of the at least one message;

determining, by the client device, a reputation value associated with a sender of the at least one message of the plurality of messages based at least in part on the monitoring, wherein the reputation value is used to identify subsequent messages that are likely spam;

publishing, by the client device, the reputation value to a reputation service;

receiving, by the client device, an aggregate of reputation values from the reputation service; and filtering, by the client device, subsequent messages based at least in part on the aggregate of reputation values, wherein the filtering includes processing the subsequent messages using a spam filter generated based at least in part on the aggregate of reputation values to indicate whether the subsequent messages are likely sent by a spammer or a legitimate sender, wherein the spam filter is leveraged utilizing the aggregate of reputation values to determine an arrangement in an inbox folder such that a first subsequent message having a first reputation value indicating that the first subsequent message having a threshold level of importance is displayed before a second subsequent message having a second reputation value indicating that the second subsequent message is likely to be spam.

2. The method as described in claim 1, wherein the monitoring includes monitoring which folder is specified by the user for storing one or more of the plurality of messages.

3. The method as described in claim 1, wherein the monitoring includes monitoring whether network routing is specified by the user to communicate one or more of the plurality of messages.

4. The method as described in claim 3, wherein the network routing includes forwarding the at least one message or replying to the at least one message.

5. The method as described in claim 1, wherein the monitoring includes monitoring whether a follow-up indication is specified by the user for the at least one message.

6. The method as described in claim 5, wherein the follow-up indication is a flag that is selectable to cause the at least one message to be accessible using a particular folder in the user interface.

7. The method as described in claim 1, wherein the monitoring includes monitoring at least one rule specified by the user for processing the plurality of messages.

8. The method as described in claim 7, wherein the rule specifies criteria and an action to be performed on the at least one message that has the criteria.

9. The method as described in claim 1, wherein the filtering includes:

processing the subsequent messages to determine a relative likelihood of importance of each processed subsequent message to the user, wherein the first reputation value obtained from processing the subsequent messages indicates the relative likelihood of importance;

marking at least one of the processed subsequent messages with the first reputation value that describes a relative likelihood of importance and marking at least one of the processed subsequent messages with the second reputation value that indicates the processed subsequent message is spam; and organizing the processed subsequent messages for display in the user interface based at least in part on the respective reputation values that describe the relative likelihood of importance of the processed subsequent messages and the respective reputation values that indicate the processed subsequent messages are spam.

10. The method as described in claim 9, wherein the organizing includes storing the processed subsequent messages in particular folders in the user interface, wherein storing includes placing at least one processed subsequent message marked as being spam in a folder for spam and placing at least one processed subsequent message in a questionable message folder, wherein the questionable message folder is configured to store processed subsequent messages which have not been identified as spam and have a low relative likelihood of importance.

11. The method as described in claim 9, wherein the organizing includes arranging the processed subsequent messages for display in an order, one to another, in the user interface based at least in part on the respective reputation values that describe the relative likelihood of importance of the processed subsequent messages and the respective reputation values that indicate the processed subsequent messages are spam.

12. A method comprising:

processing, by a client device, voicemail messages received through a Voice over Internet Protocol (VoIP) network and email messages received through an additional network using a spam filter that was generated based at least in part on a plurality of different monitored interactions of a user in a user interface with previous voicemail messages and email messages, wherein the processing results in a reputation value associated with a sender of each of the voicemail messages and email messages, wherein the reputation value is used to identify subsequent voicemail messages and email messages that are likely spam and the reputation value is based at least in part on the plurality of different monitored interactions including a monitored amount of time spent interacting with at least one message;

publishing, by the client device, the reputation value to a reputation service;

receiving, by the client device, an aggregate of reputation values from the reputation service; and arranging, by the client device, the processed voicemail messages and email messages for display in an order, one to another, in an inbox display pane of the user interface based at least in part on respective reputation values of the aggregate of reputation values, the arranging includes storing the processed voicemail messages and email messages in particular folders in the user interface, wherein the storing includes placing at least one processed voicemail message or one processed email message marked as being spam in a folder for spam and placing at least one processed voicemail message or one processed email message in a questionable message folder, wherein the questionable message folder stores processed voicemail messages and processed email messages which have not been identified as spam and have a low relative likelihood of importance.

13. The method as described in claim 12, wherein the processing is also performed by another spam filter that employs a reputation of the sender of a particular email message or voicemail message.

14. The method client device as described in claim 12, wherein the reputation value is associated with a scale bounded by a likelihood that a respective voicemail message or a respective email message is considered important to the user and a likelihood that the respective voicemail message or the respective email message is considered spam to the user.

15. The method as described in claim 12, wherein the plurality of different monitored interactions of the user with the previous voicemail messages and email messages is associated with:
- an amount of time spent with at least one of the previous voicemail messages and email messages in one or more folders in the user interface;
- the one or more folders in the user interface that is specified by the user for storing the at least one of the previous voicemail messages and email messages;
- network routing that has been specified by the user to communicate the at least one of the previous voicemail messages and email messages;
- a follow-up indication that has been specified by the user for the at least one of the previous voicemail messages and email messages; and
- at least one rule specified by the user to process the at least one of the previous voicemail messages and email messages, wherein the rule specifies criteria and at least one action to be performed on the at least one of the previous voicemail messages and email messages having the criteria.

16. The method as described in claim 12, wherein the reputation value is based at least in part on the monitored amount of time spent interacting with the at least one message relative to a monitored amount of time spent interacting with at least one other message.

17. One or more computer-readable memory devices comprising computer executable instruction that, when executed by one or more processors, direct the one or more processors of a client device to perform acts comprising:
- monitoring a plurality of different user interactions in a user interface with a plurality of email messages and a plurality of voicemail messages, wherein monitoring the user interactions includes analyzing an amount of time spent by each of the plurality of email messages and each of the plurality of voicemail messages in one or more folders in the user interface;
- processing the plurality of email messages and the plurality of voicemail messages based at least in part on the monitoring to determine a reputation value associated with a sender of each of the plurality of email messages and each of the plurality of voicemail messages, wherein the reputation value is used to identify subsequent email messages and voicemail messages that are likely spam;
- publishing the reputation value to a reputation service; and
- responsive to receiving an aggregate of reputation values from the reputation service, filtering the plurality of email messages and the plurality of voicemail messages with a spam filter, generated based at least in part on the aggregate of reputation values, to determine one or more email messages and voicemail messages that are likely sent by a spammer or a legitimate sender, the aggregate of reputation values being utilized to determine an arrangement in an inbox folder such that a first message likely sent by the legitimate sender is displayed before a second message likely sent by the spammer.

18. The one or more computer-readable memory devices as described in claim 17, wherein monitoring the plurality of different user interactions further include monitoring:
- a particular folder that is specified by the user for storing a respective email message or voicemail message;
- whether network routing is specified by the user to communicate the respective email message or voicemail message;
- whether a follow-up indication is specified by the user for the respective email message or voicemail message; and
- at least one rule specified by the user for processing messages, wherein the rule specifies criteria and an action to be performed on the respective email message or voicemail message having the criteria.

19. The one or more computer-readable memory devices as described in claim 17, wherein at least one folder is configured as an inbox and another folder is configured to store email messages or voicemail messages for deletion.

20. The one or more computer-readable memory devices as described in claim 17, wherein the acts further comprise processing the subsequent email messages and voicemail messages based at least in part on the plurality of different user interactions and organizing the subsequent email messages and voicemail messages for display in the user interface.

* * * * *